Jan. 30, 1934.    H. J. CRINER    1,945,025
BREAD SLICING MACHINE
Filed April 5, 1933    2 Sheets-Sheet 1
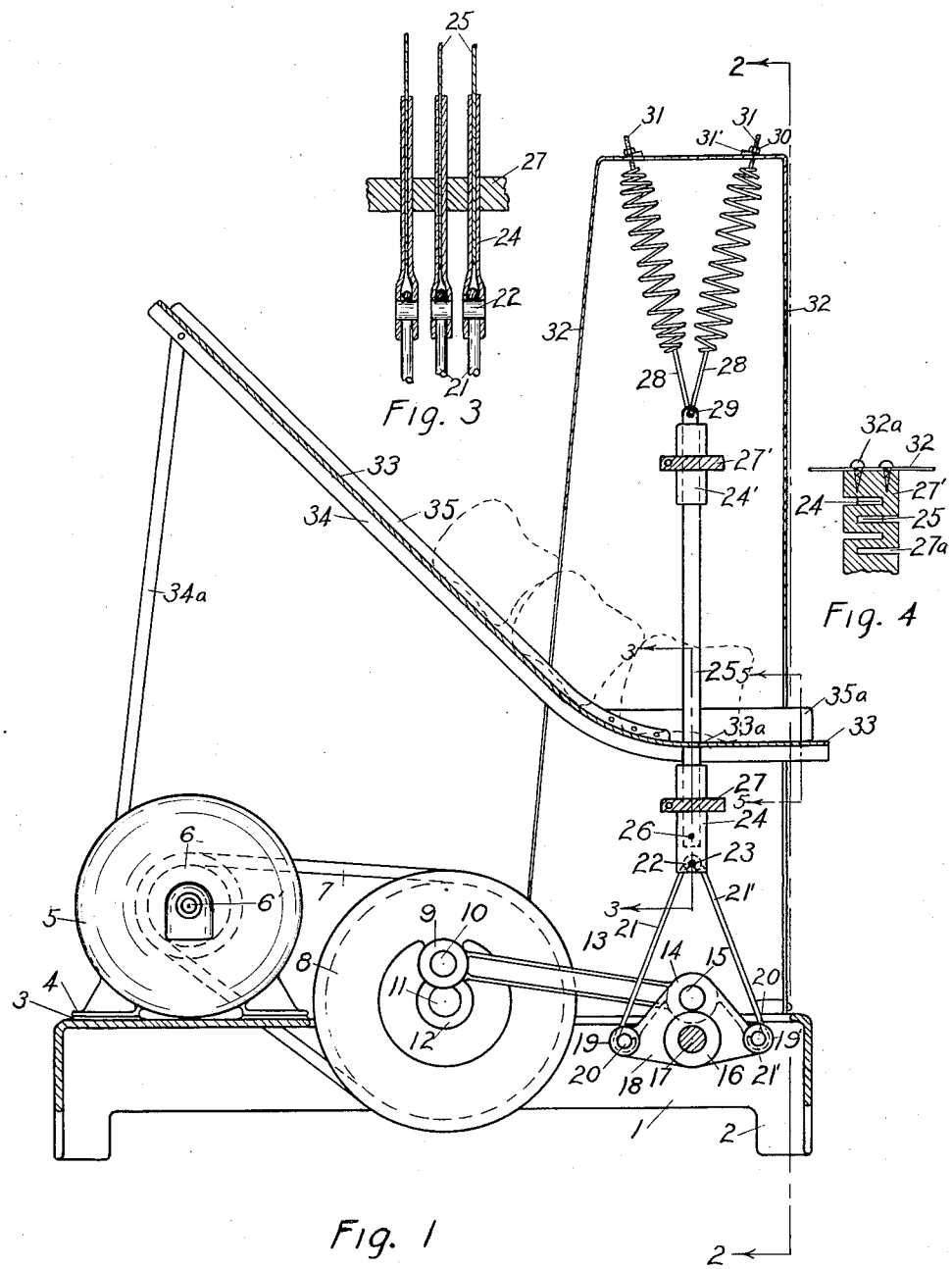
INVENTOR.
Harry J. Criner
BY
Bush & Bush
ATTORNEYS.

Jan. 30, 1934.   H. J. CRINER   1,945,025
BREAD SLICING MACHINE
Filed April 5, 1933   2 Sheets-Sheet 2

INVENTOR.
Harry J. Criner.
BY Bush & Bush
ATTORNEYS.

Patented Jan. 30, 1934

1,945,025

UNITED STATES PATENT OFFICE 1,945,025

BREAD SLICING MACHINE

Harry J. Criner, Davenport, Iowa

Application April 5, 1933. Serial No. 664,596

17 Claims. (Cl. 146—153)

My invention relates to bread slicing machines in which two alternating series of reciprocating blades are used to slice the bread.

The objects of my invention are:

1. To provide improved means to drive the cutting blades in a given plane which will permit the use of a long stroke essential to high speed cutting; and to utilize a low center of gravity.

2. To provide improved means for reducing vibration in a reciprocating cutting machine;

3. To provide improved means for guiding the cutting blades; and which will permit ready removal and replacement of the blades;

4. To provide a bread slicing machine of superior efficiency, simplicity, and cheapness of manufacture.

5. In a bread slicing machine having two alternating series of reciprocating blades driven by rocker arms, to provide means for guiding each blade so that it can travel longitudinally in a direct axial line only and to cause all of the blades to travel longitudinally in a single plane and avoid any forward and back or edgewise movement of the blades as well as any lateral movement thereof.

I attain these objects by the means illustrated in the accompanying drawings, in which,—

Figure 1 shows a vertical section of my machine on the line 1—1 of Figure 2;

Figure 3 is an enlarged sectional detail on the line 3—3 of Figure 1;

Figure 4 is an enlarged sectional detail through the middle of a portion of the upper guide-bar;

Similar numerals refer to similar parts throughout the several views.

Figures 2, 5, 6:
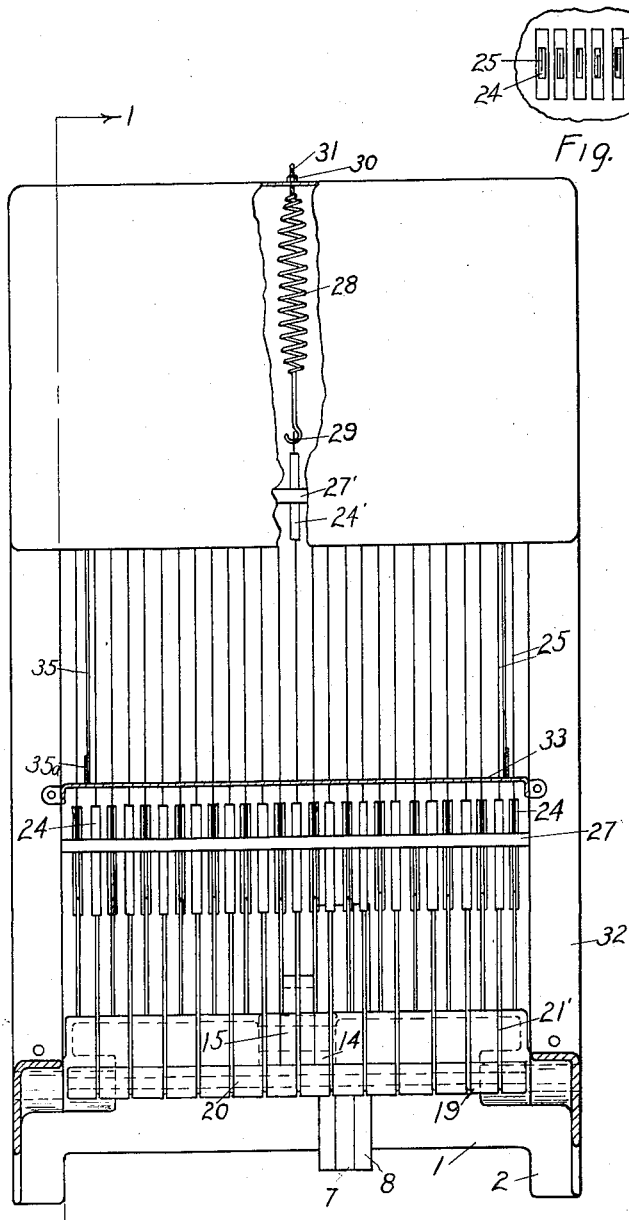
Figure 2 shows a rear elevation of my machine with a portion of the housing broken away to disclose the arrangement of the springs.
Figure 5 is an enlarged sectional detail of a portion of the feed table.
Figure 6 is an enlarged detail showing the slots in the feed table.

My machine comprises a base, 1, with legs, 2, formed integral therewith and a housing, 32, united to and extending upwardly from the base. A motor, 5, is mounted upon one end of the base with legs, 4, resting upon pads, 3, and secured to the base by bolts, set screws or other suitable means.

A pulley, 6, is mounted upon the motor shaft, 6', with a V-belt, 7, mounted upon the motor pulley and driving a combined corresponding flywheel and pulley, 8, mounted upon a pulley shaft, 11, the shaft, 11, being mounted in a boss, 12, united to the base, 1. A crank-pin, 10, is secured to the flywheel, having one end, 9, of a connecting rod, 13, pivotally mounted upon the crank-pin, 10, The opposite end, 14, of the connecting rod, 13, is pivoted upon the pin, 15, which is rigidly mounted in a rocker, 18.

The rocker, 18, has bosses, 16, formed integral therewith and these bosses are revolvably mounted upon an axle-shaft, 17, which is secured to the base at opposite sides thereof by any suitable means.

The rocker, 18, extends transversely across the machine and its front and rear edges are enlarged to form the bosses, 19 and 19'. The bosses, 19 and 19', are bored or cored longitudinally and pivot-rods, 20, are inserted therein. The bosses, 19 and 19', are slotted staggeredly and the slots are large enough to permit the introduction of the lower ends of links, 21 and 21', the lower ends of said links being formed in hook shape, the hooks being adapted to embrace and be driven by the pivot-bars, 20. The upper ends of the links, 21 and 21', are formed into hooks, 23, adapted to engage pins, 22, which are mounted in forks formed in the lower ends of the lower guides, 24. The lower ends of the guides, 24, are preferably made in the form of yokes as shown in Figure 3.

These lower guides comprise sheaths or sleeves of metal each of which embraces the lower end of one of the blades, 25, being secured thereto by a pin or rivet, 26. The upper ends of the blades, 25, are fitted with corresponding sheaths or sleeves, 24', and may be riveted or otherwise secured to the blades in any desired manner.

To the upper end of each blade the lower terminal, 29, of a tension spring, 28, is secured, the terminal being made in the form of a hook which hooks into a corresponding opening in the upper end of the blade, 25. The upper end of the spring, 28, is threaded and adjustably secured to the upper end of the housing, 32, by a nut, 30, a wedge-shaped washer, 31', being preferably inserted between the nut, 30, and the housing.

A lower guide 27, comprising a cross-bar suitably united to the housing, 32, and having alternating slots cut therein from opposite sides, embraces the lower guides or sleeves, 24, and acts as a guide to prevent lateral movement of the blades and to keep the blades in vertical alinement.

For convenience I refer to the right side of Figure 1 as the rear of the machine and to the left side of Figure 1 as the front of the machine. The guide-bar, 27, is so arranged that the guides pivoted to the connecting rods, 21, will operate in slots opening toward the front of the machine so that the guide-bar will prevent movement of the blade toward the rear of the machine and at all times will contact with the rear edges of the guides or sleeves connected with the links, 21'.

Similarly, the guides or sleeves, 24, connected to the links, 21, will at all times contact with the guide-bar, 27, at the front edge of such guides or sleeves. The slots are clearly shown in Figure 4 as 27a. The guides, 24, may extend on three sides only of the blades as shown in Figure 4 or they may completely surround the blades, if desired. A similar guide-block, 27', is mounted in the housing near the upper ends of the blades and the slots therein correspond to the slots in the lower guide-bar, 27.

The springs attached to the upper ends of the blades are inclined to the front and rear alternately as shown in Figure 1, those inclining to the rear being attached to the blades the lower ends of which are connected to the links, 21', and those inclining forwardly toward the upper end of the housing being attached to the blades the lower ends of which are connected to the links, 21, so that each spring with its corresponding link acts to exert a pull toward the rear or toward the front of the machine as the case may be, and thus holds the corresponding guides in close contact with the bearing portion of the guide-bars, 27 and 27'.

Any desired form of feed table may be used in this apparatus, but I prefer to form my feed table, 33, in the form of a chute sloping downwardly toward the blades and curved into a horizontal portion. The table, 33, comprises a central plate with downwardly projecting flanges, 34, at the sides thereof to which legs, 34a, have their upper ends united, the lower ends of the legs being united to the base by any suitable means.

Adjustable side-bars, 35, are mounted upon the table, 33, having widened extensions, 35a, united to the lower end thereof.

Slots, 33a, are formed in the table, 33, to permit the cutting blades to extend through the table and these slots are made long and wide enough to permit the passage of the guides or sleeves, 24, through the slots and therefore do not bear against or obstruct the movement of the blades in any way.

If desired, means may be added to prevent upward movement of the bread while passing through the cutting blades, but the inclined position of my bread chute, 33, with curved and horizontal portions at the lower end thereof, is so proportioned that when a continuous stream of loaves is fed to the blades, the loaf being sliced will be retained against upward movement by the downward pressure of the upper portion of the next succeeding loaf and in this way the need of hold-down plates will be obviated.

I have not shown any charging mechanism to feed the loaves onto the table, 33, nor any discharge devices to remove them from the lower end of the chute, 33, as there are many devices in common use suitable for that purpose.

In the operation of my machine, the machine is set up as described and the nuts, 30, tightened until the desired tension has been applied to the springs, 28, and through them to the blades, 25. The motor is then started.

While I have shown tension springs applied to the upper ends of the blades, it is obvious that compression springs may be utilized for that purpose or any other equivalent which will apply constant upward tension to the upper ends of the blades.

It is obvious that with this form of mechanism, the length of stroke of the blades can be varied by increasing or decreasing the width of the rocker, 18. By this means, by using a wide rocker, a vertical stroke of two inches or more may be given to the blades which will be ample to slice a very large number of loaves per minute, while with a narrower rocker and shorter stroke, the machine will slice a lesser number of loaves, but will require less power and cause somewhat less vibration.

In constructing my machine, the rocker, 16, is made of light metal and carefully balanced. The connecting rod, 13, can also be made of light metal and the links, 21 and 21', may be made of very light weight. Likewise, the guides, 24 and 24', may be made of light metal. By the use of light metal and careful balancing, vibration of the machine can be reduced to a minimum and will be much less than where the cutting blades are mounted in gangs in a movable frame so that the weight of the frame has to be started and stopped with each reciprocation of the blades.

By the use of my guides, it is possible to mount the blades so that the cutting edges will lie in a single vertical plane.

While I have shown my blades operating vertically, it is obvious that they may be mounted to operate at any desired angle.

The guide-bars, 27 and 27', are preferably formed of prepared hard maple, but any suitable oilless bearing material may be used for that purpose.

I do not limit my claims to the precise form of apparatus shown in the drawings, as various equivalents may be substituted without departing from the principle of my invention.

I claim:

1. A bread slicing machine comprising a base, a housing united thereto, an axle-shaft mounted in the base, a rocker pivotally mounted on the axle-shaft extending transversely across the base and having staggered slots formed in its front and rear edges, pivot-bars secured in the front and rear edges of the rocker passing through the slots adapted to receive and drive links, a plurality of links severally having their lower ends united to the pivot-bars and extending upwardly therefrom, a plurality of spaced cutting blades having one end pivotally united to the upper ends of the links severally, a corresponding plurality of coiled tension springs having their upper ends adjustably united to the housing at or near the top thereof and their lower ends pivotally united to the upper ends of the cutting blades, and means for reciprocating the rocker.

2. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links severally having their lower ends united to said means and extending upwardly therefrom, a plurality of spaced cutting blades having one end pivotally united to the upper ends of the links severally, a corresponding plurality of coiled tension springs having their upper ends adjustably united to the housing at or near the top thereof and their lower ends pivotally united to the upper ends of the cutting blades, means to guide the blades and cause all of them to travel in a common plane, and means for reciprocating the rocker.

3. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links severally having their lower ends united to said means and extending upwardly therefrom, a plurality of spaced cutting blades having one end pivotally united to the upper ends of the links severally, a corresponding plurality of coiled tension springs having their upper ends adjustably united to the housing at or near the top thereof and their lower ends pivotally united to the upper ends of the cutting blades, a pair of guides united to each blade severally, slotted guide bars adapted to embrace the guides and restrain them from being drawn out of a given plane by the links, and means for reciprocating the rocker.

4. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links severally having their lower ends united to said means and extending upwardly therefrom, a plurality of spaced cutting blades having one end pivotally united to the upper ends of the links severally, a corresponding plurality of coiled tension springs having their upper ends adjustably united to the housing at or near the top thereof and their lower ends pivotally united to the upper ends of the cutting blades, a pair of guides united to each blade severally, guide bars adapted to embrace the guides and restrain them from being drawn out of a given plane by the links or the springs and means for reciprocating the rocker.

5. A bread slicing machine comprising a base, a housing united thereto, an axle-shaft mounted in the base, a rocker pivotally mounted in the axle-shaft extending transversely across the base and having means united to the rocker adapted to receive and drive links, a plurality of links severally having their lower ends united to said means and extending upwardly therefrom, a plurality of spaced cutting blades having lower guides united to their lower ends severally and said guides being pivotally united to the upper ends of the links severally, upper guides united to the upper ends of the blades severally, a corresponding plurality of coiled tension springs having their upper ends adjustably united to the housing at or near the top thereof and their lower ends pivotally united to the upper ends of the cutting blades, upper and lower transverse guide bars united to the housing adjacent the guides, slots formed in the guide bars adapted to receive and direct the guides in a common plane, and means for reciprocating the rocker.

6. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links severally having their lower ends united to the pivot-bars and extending upwardly therefrom, a plurality of spaced cutting blades having lower guides united to their lower ends severally and said guides being pivotally united to the upper ends of the links severally, upper guides united to the upper ends of the blades severally, a corresponding plurality of coiled tension springs having their upper ends adjustably united to the housing at or near the top thereof and their lower ends pivotally united to the upper ends of the cutting blades, upper and lower transverse guide bars united to the housing adjacent the guides, slots formed in the guide bars adapted to receive and direct the guides in a common plane, and means for reciprocating the rocker.

7. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links severally having their lower ends united to the pivot-bars and extending upwardly therefrom, a plurality of spaced cutting blades having lower guides united to their lower ends severally and said guides being pivotally united to the upper ends of the links severally, upper guides united to the upper ends of the blades severally, a corresponding plurality of separate resilient means adjustably united to the housing at or near the top thereof and united to the cutting blades severally, adapted to exert continuous upward traction upon said blades severally, upper and lower transverse guide bars united to the housing adjacent the guides, slots formed in the guide bars adapted to receive and direct the guides in a common plane, and means for reciprocating the rocker.

8. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links arranged in front and rear series severally having their lower ends united to the pivot-bars and extending upwardly therefrom, a plurality of corresponding cutting blades arranged in two relative staggered series and having one end pivotally united to the upper ends of the corresponding links, front and rear series of coiled tension springs having their upper ends adjustably united to the housing at or near the top thereof and their lower ends pivotally united to the upper ends of the corresponding cutting blades, the front series of springs being inclined forwardly from the blades and attached to the same series of blades as the front series of links, and the rear series of springs being inclined to the rear from the blades and being attached to the same series of blades as the rear series of links, and means for reciprocating the rocker.

9. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links arranged in front and rear series severally having their lower ends united to said means and extending upwardly therefrom, a plurality of spaced corresponding cutting blades arranged in two relatively staggered series and having one end pivotally united to the upper ends of the corresponding links, front and rear series of coiled tension springs having their upper ends adjustably united to the housing at or near the top thereof and their lower ends pivotally united to the upper ends of the corresponding cutting blades, and means for reciprocating the rocker.

10. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links arranged in front and rear series severally having their lower ends united to the pivot-bars and extending upwardly therefrom, a plurality of corresponding cutting blades arranged in two relatively staggered series and having one end pivotally united to the upper ends of the corresponding links, front and rear series of coiled tension springs having their upper ends adjustably united to the housing at or near the top thereof and their lower ends pivotally united to the upper ends of the corresponding cutting blades, the front series of springs being inclined forwardly from the blades and attached to the same series of blades as the front series of links, and the rear series of springs being inclined to the rear from the blades and being attached to the same series of blades as the rear series of links, a pair of guides united to each blade severally, slotted guide bars adapted to embrace the guides and restrain them from being drawn out of a given plane by the links or the springs, and means for reciprocating the rocker.

11. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links arranged in front and rear series severally having their lower ends united to said means and extending upwardly therefrom, a plurality of spaced corresponding cutting blades arranged in two relatively staggered series and having one end pivotally united to the upper ends of the corresponding links, front and rear series of coiled tension springs having their upper ends adjustably united to the housing at or near the top thereof and their lower ends pivotally united to the upper ends of the corresponding cutting blades, a pair of guides united to each blade severally, slotted guide bars adapted to embrace the guides and restrain them from being drawn out of a given plane by the links or the springs, and means for reciprocating the rocker.

12. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links arranged in front and rear series severally having their lower ends united to the pivot-bars and extending upwardly therefrom, a plurality of corresponding cutting blades arranged in two relatively staggered series and having lower guides united to their lower ends severally and said guides being pivotally united to the upper ends of the links severally, upper guides united to the upper ends of the blades severally, upper and lower transverse guide bars united to the housing adjacent the guides, slots formed in the guide bars adapted to receive and direct the guides in a common plane, front and rear series of coiled tension springs having their upper ends adjustably united to the housing at or near the top thereof and their lower ends pivotally united to the upper ends of the corresponding cutting blades, the front series of springs being inclined forwardly from the blades and attached to the same series of blades as the front series of links, and the rear series of springs being inclined to the rear from the blades and being attached to the same series of blades as the rear series of links, and means for reciprocating the rocker.

13. A bread slicing machine comprising a base, a housing united thereto, an axle-shaft mounted in the base, a rocker pivotally mounted on the axle-shaft extending transversely across the base and having means united to the rocker adapted to receive and drive links, a plurality of links arranged in front and rear series severally having their lower ends united to said means and extending upwardly therefrom, a plurality of spaced corresponding cutting blades arranged in two relatively staggered series and having lower guides united to their lower ends severally and said guides being pivotally united to the upper ends of the links severally, upper guides united to the upper ends of the blades severally, upper and lower transverse guide bars united to the housing adjacent the guides, slots formed in the guide bars adapted to receive and direct the guides in a common plane, front and rear series of coiled tension springs having their upper ends adjustably united to the housing at or near the top thereof and their lower ends pivotally united to the upper ends of the corresponding cutting blades, and means for reciprocating the rocker.

14. A bread slicing machine comprising a base, a housing united thereto, an axle-shaft mounted in the base, a rocker pivotally mounted in the axle-shaft extending transversely across the base and having means united to the rocker adapted to receive and drive links, a plurality of links arranged in front and rear series severally having their lower ends united to said means and extending upwardly therefrom, a plurality of corresponding cutting blades arranged in two relatively staggered series and having one end pivotally united to the upper ends of the corresponding links, front and rear series of coiled tension springs having their upper ends adjustably united to the housing at or near the top thereof and their lower ends pivotally united to the upper ends of the corresponding cutting blades, the front series of springs being inclined forwardly from the blades and attached to the same series of blades as the front series of links, and the rear series of springs being inclined to the rear from the blades and being attached to the same series of blades as the rear series of links, a pair of guides united to each blade severally, slotted guide bars adapted to embrace the guides and restrain them from being drawn out of a given plane by the links or the springs, and means for reciprocating the rocker.

15. A bread slicing machine comprising a base, a housing united thereto, an axle-shaft mounted in the base, a rocker pivotally mounted in the axle-shaft extending transversely across the base and having means united to the rocker adapted to receive and drive links, a plurality of links severally having their lower ends united to said means and extending upwardly therefrom, a plurality of spaced cutting blades having lower guides united to their lower ends severally and said guides being pivotally united to the upper ends of the links severally, upper guides united to the upper ends of the blades severally, a corresponding plurality of coiled tension springs having their upper ends adjustably united to the housing at or near the top thereof and their lower ends pivotally united to the upper ends of the cutting blades, upper and lower transverse guide bars united to the housing adjacent the guides, slots formed in the guide bars adapted to receive and direct the guides, and means for reciprocating the rocker.

16. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links severally having their lower ends united to the pivot-bars and extending upwardly therefrom, a plurality of spaced cutting blades having lower guides united to their lower ends severally and said guides being pivotally united to the upper ends of the links severally, upper guides united to the upper ends of the blades severally, a corresponding plurality of coiled tension springs having their upper ends adjustably united to the housing at or near the top thereof and their lower ends pivotally united to the upper ends of the cutting blades, upper and lower transverse guide bars united to the housing adjacent the guides, slots formed in the guide bars adapted to receive and direct the guides, and means for reciprocating the rocker.

17. A bread slicing machine comprising a base, a housing united thereto, an axle-shaft mounted in the base, a rocker pivotally mounted in the axle-shaft extending transversely across the base and having staggered slots formed in its front and rear edges, pivot-bars secured in the front and rear edges of the rocker passing through the slots adapted to receive and drive links, a plurality of links severally having their lower ends united to the pivot-bars and extending upwardly therefrom, a plurality of spaced cutting blades having lower guides united to their lower ends severally and said guides being pivotally united to the upper ends of the links severally, upper guides united to the upper ends of the blades severally, a corresponding plurality of separate resilient means adjustably united to the housing at or near the top thereof and united to the cutting blades severally, adapted to exert continuous upward traction upon said blades severally, upper and lower transverse guide bars united to the housing adjacent the guides, slots formed in the guide bars adapted to receive and direct the guides, and means for reciprocating the rocker.

HARRY J. CRINER.